United States Patent
Danev (10) Patent No.: US 11,156,704 B2
(45) Date of Patent: Oct. 26, 2021

(54) METHOD, DEVICE AND SYSTEM FOR SECURE DISTANCE MEASUREMENT

(71) Applicant: 3DB Access AG, Thalwil (CH)

(72) Inventor: Boris Danev, Thalwil (CH)

(73) Assignee: 3DB ACCESS AG, Thalwil (CH)

( * ) Notice: Subject to any disclaimer, the term of this patent is extended or adjusted under 35 U.S.C. 154(b) by 258 days.

(21) Appl. No.: 15/781,976

(22) PCT Filed: Dec. 28, 2016

(86) PCT No.: PCT/EP2016/002195
§ 371 (c)(1),
(2) Date: Jun. 6, 2018

(87) PCT Pub. No.: WO2017/121452
PCT Pub. Date: Jul. 20, 2017

(65) Prior Publication Data
US 2018/0367994 A1 Dec. 20, 2018

(30) Foreign Application Priority Data

Jan. 13, 2016 (CH) ..................................... 00045/16

(51) Int. Cl.
*H04W 12/06* (2021.01)
*G01S 11/08* (2006.01)
(Continued)

(52) U.S. Cl.
CPC .......... *G01S 11/08* (2013.01); *G07C 9/00309* (2013.01); *H04B 1/707* (2013.01);
(Continued)

(58) Field of Classification Search
CPC .............. H04W 12/06; H04W 12/0609; G07C 9/00309; G07C 2009/00555;
(Continued)

(56) References Cited

U.S. PATENT DOCUMENTS

| 7,574,219 B2 | 8/2009 | Rofheart et al. |
| 2005/0265503 A1* | 12/2005 | Rofheart ................. G01S 7/023 375/354 |

(Continued)

FOREIGN PATENT DOCUMENTS

EP   1986022 A1   10/2008

OTHER PUBLICATIONS

International Search Report and Written Opinion for PCT/EP2016/002195 dated Jun. 7, 2017, 9 pages.

*Primary Examiner* — Jeffrey C Pwu
*Assistant Examiner* — Nega Woldemariam
(74) *Attorney, Agent, or Firm* — Blank Rome LLP (57) ABSTRACT

Method for secure distance measurement comprising the following steps: transmitting from a verifier (V) to a prover (P) a challenge message comprising a challenge bit sequence (C); transmitting from the prover (P) to the verifier (V) a response message comprising the response bit sequence (R); verifying, in the verifier (V), the response message on the basis of the response bit sequence (R); and determining, in the verifier (V), the distance between the verifier (V) and the prover (P) on the basis of the time difference between the challenge message and the response message. The challenge message and/or the response message are transmitted by a transmission protocol in which the bit sequence (C, R) of the corresponding message is transmitted by a transformed spreading code chip sequence (TCSCS, TRSCS), wherein the transformed spreading code chip sequence (TCSCS, TRSCS) is obtained by transforming a spreading code chip sequence (CSCS, RSCS) of the bit sequence (C, R) on the basis of a transform function ($f_{trans}$).

18 Claims, 3 Drawing Sheets

(51) Int. Cl.
  *H04B 1/707*   (2011.01)
  *H04L 9/32*    (2006.01)
  *H04L 9/08*    (2006.01)
  *G07C 9/00*    (2020.01)
  *H04W 12/069*  (2021.01)
  *H04J 13/00*   (2011.01)
  *G01S 5/02*    (2010.01)
  *G01S 13/76*   (2006.01)

(52) U.S. Cl.
  CPC .......... *H04L 9/0872* (2013.01); *H04L 9/3271* (2013.01); *H04W 12/069* (2021.01); *G01S 5/0221* (2013.01); *G01S 13/765* (2013.01); *G07C 2009/00555* (2013.01); *H04B 2201/70715* (2013.01); *H04J 13/0003* (2013.01)

(58) Field of Classification Search
  CPC ...... H04L 9/0872; H04L 9/3271; G01S 11/08; G01S 13/765; G01S 5/0221; H04B 1/707; H04B 221/70715; H04J 13/0003
  USPC ........................................................ 380/258
  See application file for complete search history.

(56) References Cited

U.S. PATENT DOCUMENTS

2010/0231435 A1* 9/2010 Zhen ..................... G01S 13/765
                                                   342/47
2015/0200706 A1* 7/2015 Bottazzi .............. G01S 13/0209
                                                   375/140

* cited by examiner

METHOD, DEVICE AND SYSTEM FOR SECURE DISTANCE MEASUREMENT

RELATED APPLICATIONS

This application is a national phase of PCT/EP2016/002195, filed on Dec. 28, 2016, which claims the benefit of Swiss Application No. 00045/16, filed Jan. 13, 2016. The entire contents of these applications are hereby incorporated by reference.

FIELD OF THE INVENTION

The present invention concerns method, device and system for secure distance measurement using a spread spectrum.

DESCRIPTION OF RELATED ART

Figure 1:
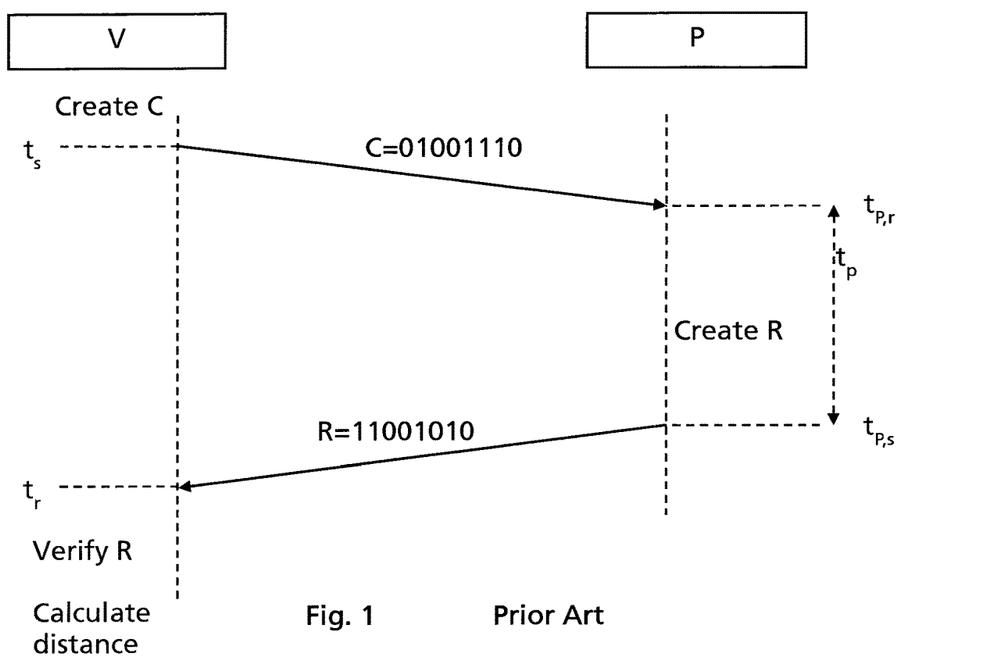
FIG. 1 shows an illustration of a state of the art verifier prover system with secure distance measurement.

In many fields of technology, secure distance measurement becomes an important way for authenticating somebody or for allowing something based on physical proximity proof. The logical model of such a distance measurement is shown in FIG. 1. In general, a verifier V sends a challenge message C to a prover P. The verifier V and the prover P have a common key which is used to verify the response message R. The prover P sends the response message R created in the prover P back to the verifier V which can then verify the authenticity by checking first the correctness of the response message R on the basis of the common key and second the distance of the prover P to the verifier V on the basis of the time difference between the time $t_s$ of sending the challenge C and the time $t_r$ of receiving the response message R. Such systems are known for electronic payment between a payment terminal (V) and payment means (P) like a chip card, a mobile telephone, etc. or for electronically unlocking and/or starting a car (V), when the key fob (P) approaches the car or is in the car.

Figure 2:
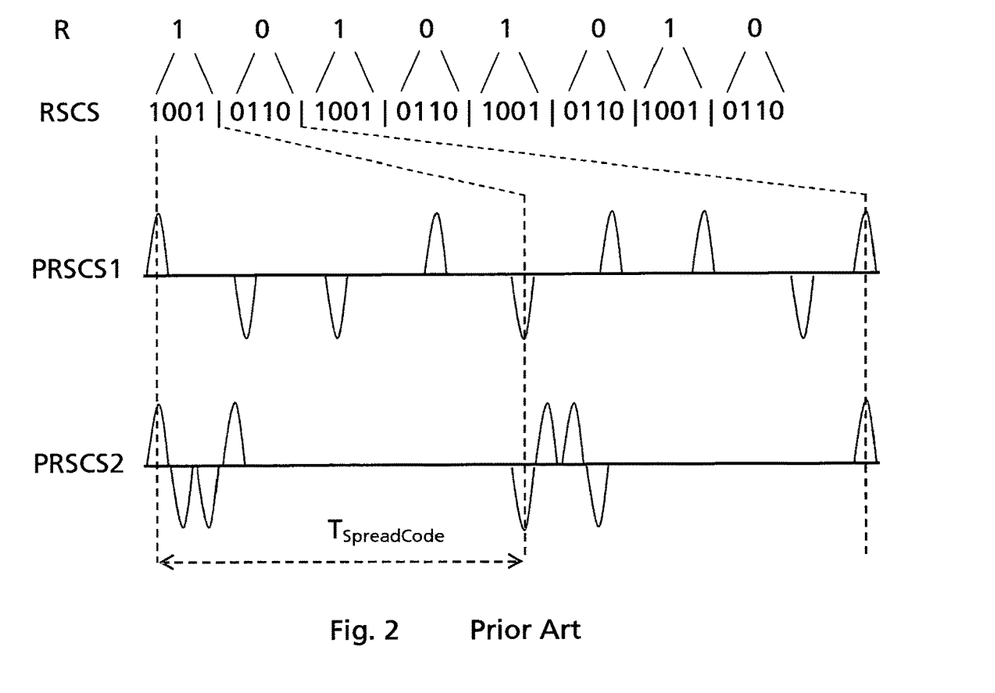
FIG. 2 shows a state of the art spreading code chip sequences.

In order to avoid any malfunction of this secure distance verification process, it is desirable that it works also for high noise or strong attenuated situations, for example if the prover (P) is close to a lossy medium (e.g. trousers pocket). One possibility is to use a spreading code in order to generate coding gain for each logical bit symbol as shown in FIG. 2. The logical bit 1 is replaced by a first spreading code and the logical bit 0 is replaced by a second spreading code. The spreading codes comprise each at least two symbols which are called chips. The response R leads therefore to a response spreading code sequence RSCS. The bigger the spreading codes are, the higher is the coding gain so that a logical bit can be detected more robustly. In FIG. 2, each logical bit is replaced by a spreading code with 4 chips. In verifier prover systems, preferably the chips of the RSCS are physically transmitted by sequentially transmitted short pulses. A first example of a physically RSCS (PRSCS1) distributes the chips/pulses for each spread symbol equidistantly over the length $T_{SpreadCode}$ of one spreading code. A second example of a physically RSCS (PRSCS2) groups the chips/pulses for each spread symbol at the beginning of the duration $T_{SpreadCode}$ so that the distance between the chips of the same spreading code is shorter than the distance between the last chip to the first chip of the subsequent spreading code. Many other transmission schemes of chips within one spreading code are possible. EP1986022 and US2015/200706 disclose the use of spreading codes for distance measurements.

Figure 3:
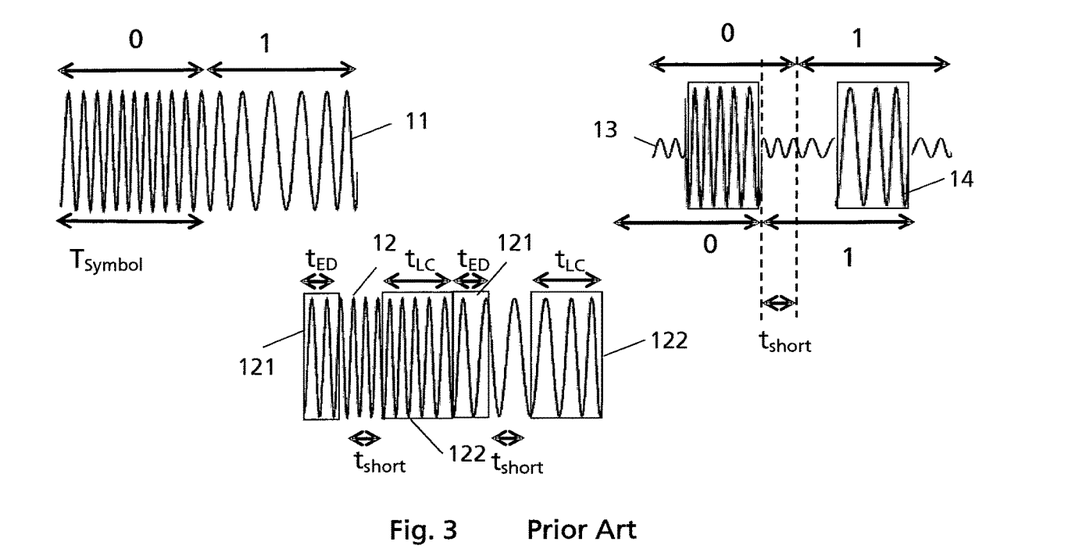
FIG. 3 shows a state of the art early detect late commit attack.

One disadvantage of spreading codes is that the duration of the transmission of one logical bit ($T_{SpreadCode}$) is significantly longer than the length of one pulse. The long duration of the spreading codes allows early detect late commit attacks. In this attack, an attacker transmits the challenge C to the prover P (if not already received from the prover directly), intercepts the response from the prover P and sends the response back to the verifier V. FIG. 3 shows the signal 11 transmitted from for example the prover P, the signal 12 received at the attacker intercepting the signal 11, the signal 13 received at the verifier V directly from the prover P (if any) and the signal 14 received at the verifier V from the attacker. For each logical symbol/bit transmitted (here 0 and 1), the attacker detects within a first portion 121 of each symbol the transmitted symbol and anticipates then the transmitted symbol by sending out in advance the end portion 121 of the symbol. The attacker can thus anticipate the arrival of the symbol at the verifier by $t_{short} = T_{Symbol} - t_{ED} - t_{LC}$ with the early detect time $t_{ED}$ being the time needed to detect the symbol and the late commit time $t_{LC}$ being the time of the end portion of the symbol being transmitted by the attacker to the verifier. The longer the symbol length $T_{Symbol}$ is, the higher is $t_{short}$ and thus the more the pretended distance can be shortened. This attack model can thus shorten the distance even on encrypted bit sequences, because they are encrypted only on the logical bit level and the attacker can intercept and retransmit bit by bit each bit of the transmitted bit sequence. Since spreading codes used in pulse based transmission protocols as used often in distance measurement protocols lead to long symbols, they are vulnerable to this attack model.

Since one or few chips of a spreading code might be enough to early detect the spreading code, such a physical attack might be a severe risk for the security with the use of longer spreading codes.

Therefore, spreading codes may have the advantage of increased coding gain, but bring the disadvantage of an increased risk of physical attacks.

BRIEF SUMMARY OF THE INVENTION

It is object of the invention to provide a secure and robust distance measurement.

According to the invention, this object is achieved by a Method for secure distance measurement and a device of a system for secure distance measurement according to the independent claims.

By transmitting not the spreading code chip sequence obtained by replacing each logical bit by the corresponding spreading code, but a transformed spreading code chip sequence, the attacker cannot early detect the individual spreading codes of the logical bits anymore. The transformation on the chip level eliminates the possibility of an early detect late commit attack and the bit sequences between the verifier and the prover can still be exchanged with spreading codes increasing the coding gain.

The dependent claims refer to advantageous embodiments of the invention.

In one embodiment, the transform function is exchanged between the prover and the verifier by an encrypted message before transmitting the challenge message and/or the response message. This has the advantage of an increased security, because the transform function cannot be encrypted with the time.

In one embodiment, the transform function is such that it does not degrade the property of the spreading code. This can be achieved for example by a transform function within which each chip of the transformed spreading code chip sequence depends on only one chip of the spreading code chip sequence.

In one embodiment, the verifier or the prover receiving the message further stores the sample points of the received message including all chips of the transformed spreading code chip sequence, and detects the transformed spreading code chip sequence from the stored sample points of the received message. This has the advantage that the detection of the transformed spreading code chip sequence can be performed on the basis of all received chips and must not be performed on the fly.

In one embodiment, the verifier or the prover receiving the message further predicts time windows, when each chip of the transformed spreading code chip sequence will be received, and stores the sample points of the received message for the predicted time windows, and detects the transformed spreading code chip sequence from the stored time windows of the received message. This has the advantage that the needed storage can be significantly decreased, in particular for pulse based protocols.

In one embodiment, the prediction of the time windows considers the time offset between the verifier and the prover. This has the advantage that the time windows are more precisely estimated and the time windows can be chosen smaller.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 5:
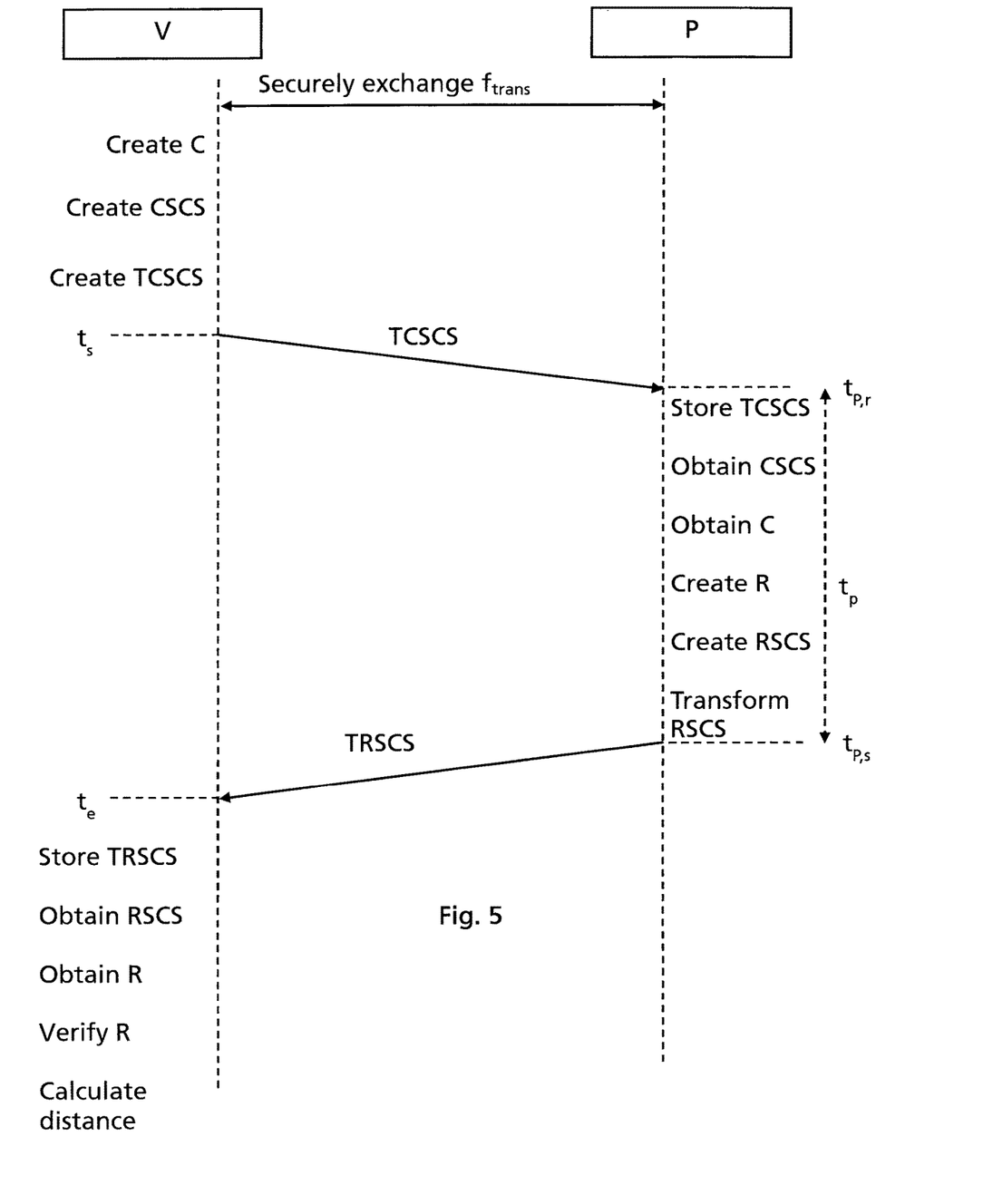
FIG. 5 shows an illustration of an embodiment of a verifier prover system and method with secure distance measurement.

FIG. 5 shows the System and Method for secure distance measurements between a verifier V and prover P.

The verifier V transmits a challenge message to the prover P. The challenge message contains a challenge bit sequence C. The challenge bit sequence C is a sequence of logical bits which is normally randomly generated in the verifier V. The prover P receives the challenge message with the challenge bit sequence C. When the prover P has received the challenge message, it creates a response bit sequence R and transmits a response message with the response bit sequence R back to the verifier V. The verifier V receives the response message with the response bit sequence R, verifies the authenticity of prover P on the basis of the response bit sequence R and cryptographic key(s) and checks the distance to the prover P on the basis of the time of flight.

For the verification, the prover P and the verifier share a common cryptographic key. The common cryptographic key may be a common symmetric key or be two key pairs, wherein each of the prover P and the verifier V has its own private key and the public key of the other.

The number of verification methods is manifold, and the method to create the response message and verifying the response message in the verifier V change according to the used verification method. The invention is not restricted to one verification method.

In one exemplary verification method, the prover P creates the response bit sequence R on the basis of the received challenge bit sequence C and the common cryptographic key. This may be achieved by encrypting the challenge bit sequence C by the common cryptographic key or by computing a cryptographic hash function of the challenge bit sequence C and a prover generated bit sequence using the common cryptographic key. Many other functions depending on the challenge bit sequence C and the common cryptographic key are possible. The verifier V can then verify the prover P on the basis of the response bit sequence R, the challenge bit sequence C and the common cryptographic key, for example by determining the response bit sequence R from the transmitted challenge bit sequence C and the cryptographic key in the same way as in the prover P and comparing the determined response bit sequence R with the received response bit sequence R.

In another exemplary verification embodiment, the response bit sequence R is independent of the common cryptographic key. For example, the response bit sequence R could be a random bit sequence created in the prover P or some fast function of itself and the challenge bit sequence C. This has the advantage that the time of processing $t_p$ in the prover P can be reduced. In this case, a verification message is sent after the response message from prover P to the verifier V containing a verification bit sequence depending on the challenge bit sequence C, the response bit sequence R and the common cryptographic key. The verifier V can then verify the authenticity of the received response message including the response bit sequence R on the basis of the challenge bit sequence C, the verification bit sequence and the common cryptographic key.

The performed check of the distance between the verifier V and the prover P is based on the challenge message and the response message. The distance is determined or estimated on the basis of the time of flight of the challenge message and the response message. Since the time of flight and the distance are directly proportional to each other via the constant medium's velocity of the challenge and the response message, the determination of the time of flight of the challenge and response message corresponds to the determination of the distance between verifier V and the prover P and is not distinguished in this invention. The methods to determine the time of flight is manifold and shall not restrict the invention. In one embodiment, the time of flight is based on the time difference $t_e - t_s$ between the transmission of the challenge message and the reception of the response message at the verifier V. In order to check the distance or time of flight, the determined time of flight or distance is compared with a threshold. If the time of flight or distance is smaller than a certain threshold, the authorisation for a certain action, like opening the door of a car, starting the engine, etc., is given, if the verification described before is also positive. Preferably, the time difference $t_e - t_s$ or the threshold is corrected by the processing time $t_p$ at the prover P so that the time difference $t_e - t_s$ is reduced or the threshold is increased by the processing time $t_p$. The processing time $t_p$ is preferably fixed and can be corrected for each distance measurement in the same (hard coded) way. However, it would also be possible to transmit the processing time $t_p$ or the sending time the sending time $t_{P,s}$ of the response message and the receiving time $t_{P,r}$ of the challenge message with the response message or another message. As already mentioned, the invention is not restricted to any of those methods for checking the distance or the time of flight.

A message is preferably defined as sequence of bits belonging to the same transmission package. The message comprises at least one information bit sequence. Preferably, the information bit sequence comprises for each message an identifier bit sequence of the sender and/or of the recipient. This could be for example a MAC address or a Service Set Identifier (SSID). The identifier(s) is/are preferably 32 bit or longer. The identifier bit sequence is preferably arranged before the challenge and/or response bit sequence of the challenge and/or response message described below. Preferably, the messages comprise additionally a header section and/or an end section. Preferably, the header section comprises a preamble configured to detect a new message at the receiver of the prover P or the verifier V. The preamble is preferably identical for each message or each message type. Preferably, the header section contains a sync pattern. The sync pattern is preferably arranged after the preamble. The sync pattern is preferably identical for each message or each message type. The sync pattern is used to synchronize the receiver to the received message which improves the reception quality. Preferably, the end section comprises for example a postamble configured to detect at the receiver an end of the received message. The end section is arranged after the information bit sequence. However, the header section and/or the end section is/are optional. For example, the end of the message could also be determined by having a known length. The header section and/or the end section or parts thereof could be only present in the physical layer (PHYS) of the OSI reference model and not in the logical layer or data link layer, for example the preamble, the sync pattern and/or the postamble. This means that the parts being only present in the physical layer do not correspond to a bit sequence in the logical layer. Preferably, the preamble, the sync pattern and/or the postamble is a predetermined sequence of chips, which are equal for each message.

The challenge message and the response message are defined as the two messages used for checking the distance between the verifier V and the prover P. The challenge message is the message sent from the verifier V to the prover P defining the starting time $t_s$ of the time of flight as the time when the message or one well-defined signal part of the message is physically transmitted from the verifier V. The information bit sequence of the challenge message comprises at least the challenge bit sequence, but can comprise further information bit sequences. The response message is the message sent from the prover P to the verifier V after having received the challenge message at the prover P defining the end time $t_e$ of the time of flight as the time when the message or one well-defined signal part of the message is physically received at the verifier V. The information bit sequence of the response message comprises at least the response bit sequence, but can comprise further information bit sequences.

Preferably, the messages are transferred by a sequence of pulsed physical symbols corresponding to a sequence of logical bits. The messages are preferably transmitted by electromagnetic waves. Preferably, wide band pulses with a frequency bandwidth of at least 50 MHz (Megahertz). Even more preferably, an ultra wide band (UWB) pulse is used with a frequency bandwidth of at least 500 MHz. The high bandwidth shortens the time of the pulse which first reduces the estimation error of the time of arrival and the time of departure of a pulse and second reduces the possibility of any physical attack on the pulse level. For example a pulse rate of 4 MHz and a pulse bandwidth of 500 MHz could be used. There are transmitted two types of pulses representing two physically symbols. They could be distinguished by any physical feature, e.g. by different frequency (binary frequency shift keying), different phase (binary phase shift keying), different amplitude (binary amplitude shift keying) or other schemes (e.g., Pulse-position modulation (PPM), On-Off Keying (OOK)). Preferably, the pulses are transmitted equidistantly, but it is also possible that the pulse pattern shows different distances between the pulses.

In order to detect the time of arrival or the time of transmission of a message, preferably a well-defined signal part of the physical message is defined for the challenge and the response message. This could be one single pulse, e.g. the first pulse or any other sequence of pulses in the header section, e.g. the preamble. However, the time of arrival/departure of a message could be also defined by a function of more pulse times. However, the definition should be the same for the challenge message and the response message, i.e. for the time of arrival and the time of departure.

According to the invention, the challenge and/or the response message, preferably all, messages, is/are transferred using a spread spectrum coding scheme. This means that each logical bit/symbol 1 and 0 is physically transmitted by a corresponding spreading code comprising each a fixed sequence of at least two physically transmitted symbols formed by chips. Preferably, each chip corresponds to one pulse described above. A first chip value corresponds to a first type of pulse while a second chip value corresponds to a second type of pulse. The logical bit 1 is for example replaced by a first spreading code having a first sequence of chips and the logical bit 0 is replaced by a second spreading code having a second sequence of chips being distinct to the first sequence of chips. This achieves a coding gain and allows that the method and system becomes much more robust to signal noise and avoids transmission errors. The used spreading codes for obtaining optimal coding gains are well known, e.g. Gold codes etc. Preferably, the first spreading code is orthogonal to the second spreading code. FIG. 2 shows an example of a response spreading code chip sequence RSCS obtained by replacing each logical bit of the response bit sequence R by its corresponding spreading code. In this example, the first spreading code replacing 1 being the sequence of four chips 1001 and the second spreading code replacing 0 being the sequence of four chips 0110. The two examples of the physically transmitted RSCS (PRSCS) is shown in FIG. 2 as already explained in the introduction, wherein each chip corresponds a pulse as described above.

Figure 4:
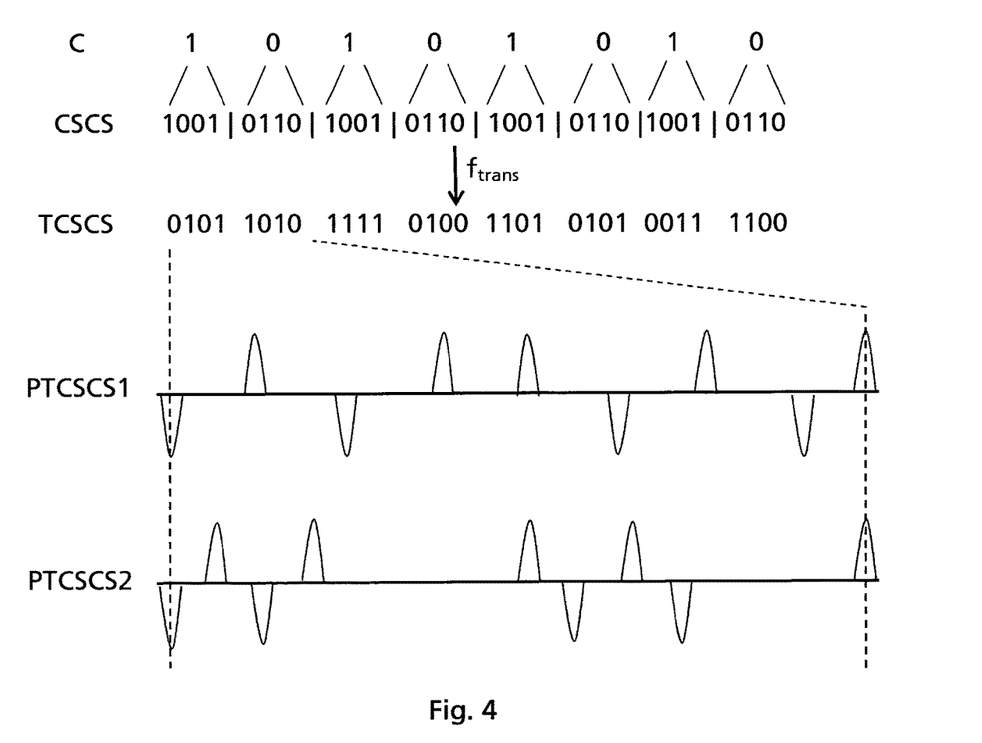
FIG. 4 shows an embodiment of a transformed spreading code chip sequence.

State of the art spread spectrums used in challenge and response messages have the disadvantage that an attacker could intercept a transmitted challenge bit sequence and/or response bit sequence, predict each bit on the basis of the first chips of the corresponding chip code and retransmit early the end of the predicted spreading code in order to pretend that the prover P is closer to the verifier V in terms of physical distance. Therefore, the invention suggest now to transform the chips of the challenge spreading code chip sequence (CSCS) and/or of the response spreading code chip sequence (RSCS) before the transmission by a transform function $f_{trans}$ known by the prover P and the verifier V as shown in FIG. 4. This transformation of the spreading code chip sequence on the physical level avoids that an attacker could predict the next chips in the physical transformed spreading code chip sequence as shown in FIG. 4 for the physical transformed challenge spreading code chip sequence PTCSC1 and PTCSC2. Therefore, any early detect late commit attack on the challenge bit sequence C and/or response bit sequence R would fail. Preferably, only the challenge spreading code chip sequence CSCS and/or the response spreading code chip sequence RSCS are sent in a transformed way while the remaining spreading codes, for example relating to the header section and/or the end section or of bit sequences relating to other information than the challenge bit sequence C and/or the response bit sequence R are transmitted with the normal spreading code chip sequence obtained by replacing each bit by its corresponding spreading code without a transformation. Preferably, both of the challenge spreading code chip sequence CSCS and the response spreading code chip sequence RSCS are sent in a transformed way. This allows to avoid any early detect and late commit attack on both messages. However, the invention could also be applied to only one of the two messages reducing the possible time of flight reduction by the attacker by a factor of two.

The transform function $f_{trans}$ is any function configured to -trans transform the challenge/response spreading code chip sequence such into the transformed challenge/response spreading code function that an attacker cannot early detect all bits of the challenge/response bit sequence. This transform function $f_{trans}$ cannot be the identity, since the transformed challenge/response spreading code chip sequence must be distinct from the challenge/response spreading code chip sequence. Preferably, the transform function $f_{trans}$ transforms the complete challenge/response spreading code chip sequence. However, it could also be sufficient that only a part of the challenge/response spreading code chip sequence CSCS/RSCS is transformed by the transform function $f_{trans}$. Preferably, the transform function $f_{trans}$ is the same for the challenge spreading code chip sequence CSCS and the spreading code chip sequence RSCS following directly after the CSCS. However, it is also possible that the transform function $f_{trans}$ comprises a first function for transforming the challenge spreading code chip sequence CSCS and a second distinct function for transforming the response spreading code chip sequence RSCS. Preferably, the transform function $f_{trans}$ is such that each chip of the transformed spreading code chip sequence TCSCS, TRSCS depends on only one chip of the spreading code chip sequence CSCS, RSCS. This has the advantage that a false detection of one chip of the transformed spreading code chip sequence TCSCS, TRSCS due to noise would affect only one chip of the spreading code chip sequence CSCS, RSCS in the receiving device, for example an XOR function or even more preferably a mixing function. The mixing function has in addition to other such function as XOR the characteristic that the number of first chips and the number of second chips remain the same, but only their order is changed.

This method and system for secure distance measurement will now be described in more detail with the embodiment shown in FIG. 5.

In the shown embodiment, the transform function $f_{trans}$ is securely exchanged before the second one of the verifier V and the prover P uses the transform function $f_{trans}$. This has the advantage that the transform function $f_{trans}$ can be changed regularly which increases the security of this approach. For example the transform function $f_{trans}$ could be changed after each challenge-response message pair, after a number of challenge-response message pairs or after certain time period. Preferably, the transform function $f_{trans}$ is randomly created (evtl. under certain of the above-mentioned constraints) in the verifier V and transmitted to the prover P. The exchanged/transmitted transform function $f_{trans}$ is preferably encrypted by a common communication key. The communication key is preferably a symmetric key to lower the computational burden in the verifier V and the prover P. However, also an asymmetric key pair would be possible. Preferably, the transform function $f_{trans}$ is exchanged in a separate message before transmitting the challenge message. This has the advantage that processing time $t_p$ between the challenge message and the response message in the prover P is not increased by the decryption of the transform function $f_{trans}$. However, it would also be possible to exchange the transform function $f_{trans}$ in the challenge message and/or the response message. It is further possible to define a fixed transform function $f_{trans}$ known in the prover P and the verifier V without the need to exchange the transform function $f_{trans}$.

As already explained above, the verifier V creates then a bit sequence of a challenge message comprising a challenge bit sequence C and optionally other bit sequences of the information bit sequence, e.g. the identifier bit sequence. The bit sequence of the challenge message, in particular the challenge bit sequence C, is translated into a spreading code chip sequence of the challenge message including the challenge spreading code chip sequence CSCS. The spreading code chip sequence is obtained by replacing each bit by its corresponding spreading code, i.e. if the bit is a 1 by the first spreading code and if the bit is a 0 by the second spreading code. Then, the transform function $f_{trans}$ is applied (preferably only) on the challenge spreading code chip sequences CSCS to obtain the transformed challenge spreading code chip sequence TCSCS. An eventually used header section and/or end section are added to the challenge message in the physical layer. Then, the challenge message with the transformed challenge spreading code chip sequence TCSCS and optionally with the (preferably not transformed) spreading code chip sequences of the other information bit sequences is transmitted from the verifier V to the prover P. Preferably, the chips are transmitted by pulses as described above. The time of transmission/departure $t_s$ of the challenge message is determined as described above. The determined time $t_s$ could be stored or could start a timer.

The prover P receives the challenge message. The prover P for example detects the received message by detecting the preamble. On the basis of the detected received message and optionally on the basis of the synchronisation on the sync pattern, the prover P knows, when the transformed challenge spreading code chip sequence TCSCS is received or at least the transformed part of the transformed challenge spreading code chip sequence TCSCS. The received transformed challenge spreading code chip sequence TCSCS or at least the transformed part of the transformed challenge spreading code chip sequence TCSCS is stored. Preferably, the received analogue signal of the challenge message is digitalized and the sample points of the transformed challenge spreading code chip sequence TCSCS or at least the transformed part of the transformed challenge spreading code chip sequence TCSCS are stored. The transformed challenge spreading code chip sequence TCSCS or at least the transformed part of the transformed challenge spreading code chip sequence TCSCS is detected on the basis of the sample points of the transformed challenge spreading code chip sequence TCSCS or at least the transformed part of the transformed challenge spreading code chip sequence TCSCS. The detected transformed challenge spreading code chip sequence TCSCS is retransformed on the basis of the transform function $f_{trans}$ into the challenge spreading code chip sequence CSCS. Then, the challenge bit sequence C can be determined robustly from the challenge spreading code chip sequence CSCS even in noisy environments. However, due to the transformation of the challenge spreading code chip sequence CSCS, no attacker could perform an early detect late commit attack on the spreading codes. In another embodiment, it is possible to detect individually each chip of the received transformed challenge spreading code chip sequence TCSCS without the need to store the sample points, but storing only the detected chips for all chips of the TCSCS (or its transformed part).

In the embodiment storing the sample points of the analogue signal comprising the transformed challenge spreading code chip sequence TCSCS, preferably, the time windows of each chip of the transformed challenge spreading code chip sequence TCSCS is predicted and only those time windows are stored and/or processed. Since the chips or pulses follow a well-defined order, the detection of one or few chips could be used to predict the time windows. Preferably, the header section (or its corresponding chip sequence) is used, preferably the sync pattern. This saves storage space and increases the processing speed, because less data have to be processed to detect the received chips. To minimize the size of the time windows, the prediction could be improved by estimating the time offset between the verifier V and the prover P. This time offset could be determined in many ways without limiting the invention. For example the estimation of the time offset could be based on the difference between the time of the preamble and postamble or other information transmitted or on a time exchanged between the prover P and verifier V. In another example the estimation of the time offset could be based on any information bit sequences transmitted before the transformed challenge spreading code chip sequence TCSCS, e.g. the identifier of the sender and/or receiver of the message. For example the expected analogue signal of the known bit/chip sequence of the identifier can be correlated on the fly with the received analogue signal of the identifier (or part of it), wherein the time offset is estimated on the basis of the development of the correlation quality over time. For example, the size of the time windows could be determined on the basis of the estimated time offset, e.g. on the basis of the development of the correlation quality. If a mixing function is used as transform function, it would also be possible to transform the time windows and detect then the challenge spreading code chip sequence CSCS directly from the time windows.

The prover P creates the response bit sequence R after having the received challenge message. If the response bit sequence R does not depend on the challenge bit sequence C, the described process of receiving, storing and transforming the transformed challenge spreading code chip sequence TCSCS and detecting the challenge bit sequence C could be performed also during or after the creation of the response bit sequence, eventually also after the transmission of the response message.

The prover P creates then a bit sequence of a response message comprising a response bit sequence C and optionally other bit sequences relating to other information. The bit sequence of the response message, in particular the response bit sequence R is translated into a spreading code chip sequence of the response message including the response spreading code chip sequence RSCS. Then, the transform function $f_{trans}$ is applied (preferably only) on the response spreading code chip sequence RSCS to obain the transformed response spreading code chip sequence TRSCS. Then, the response message with the transformed response spreading code chip sequence TRSCS and optionally with the (preferably not transformed) spreading code chip sequences of the the other bit sequences is transmitted from the prover P to the verifier V. Preferably, the chips are transmitted by pulses as described above.

The verifier V receives the response message. The verifier V for example detects the received message by detecting the well-defined preamble. On the basis of the detected received message and optionally on the basis of the synchronisation on the sync pattern, the verifier V knows, when the transformed response spreading code chip sequence TRSCS is received or at least the transformed part of the transformed response spreading code chip sequence TRSCS. The received transformed response spreading code chip sequence TRSCS or at least the transformed part of the transformed response spreading code chip sequence TRSCS is stored. Preferably, the received analogue signal of the response message is digitalized and the sample points of the transformed response spreading code chip sequence TRSCS or at least the transformed part of the transformed response spreading code chip sequence TRSCS are stored. The transformed response spreading code chip sequence TRSCS or at least the transformed part of the transformed response spreading code chip sequence TRSCS is detected on the basis of the sample points of the transformed response spreading code chip sequence TRSCS or at least the transformed part of the transformed response spreading code chip sequence TRSCS. The detected transformed response spreading code chip sequence TRSCS is retransformed on the basis of the transform function $f_{trans}$ into the response spreading code chip sequence RSCS. Then, the response bit sequence R can be determined robustly from the response spreading code chip sequence RSCS even in noisy environments. However, due to the transformation of the response spreading code chip sequence RSCS, no attacker could perform an early detect late commit attack on the spreading codes. In another embodiment, it is possible to detect individually each chip of the received transformed response spreading code chip sequence TRSCS without the need to store the sample points, but storing only the detected chips (zeros and ones) for all chips of the TRSCS (or its transformed part).

In the embodiment storing the sample points of the analogue signal comprising the transformed response spreading code chip sequence TRSCS, preferably, the time windows of each chip of the transformed response spreading code chip sequence TRSCS is predicted and only those time windows are stored and/or processed. Since the chips or pulses follow a well-defined order, the detection of one or few chips could be used to predict the time windows. Preferably, the header section (or its corresponding chip sequence) is used, preferably the sync pattern. This saves storage space and increases the processing speed, because less data have to be processed to detect the received chips. To minimize the size of the time windows, the prediction could be improved by estimating the time offset between the verifier V and the prover P. This time offset could be determined in many ways without limiting the invention as described above for the challenge message. If a mixing function is used as transform function, it would also be possible to transform the time windows and detect then the response spreading code chip sequence RSCS directly from the time windows.

The time of reception/arrival $t_e$ of the response message is determined as described above. The determined time $t_s$ could be stored, could end a timer or could be used to compute the time difference $t_e-t_s$ between the time of reception and the time of transmission stored. Then, the above-described verification of the received response bit sequence and the above-described determination of the distance of between the prover P and the verifier V is performed.

The invention claimed is:

1. A method for secure distance measurement comprising the following steps:
   transmitting from a verifier to a prover a challenge message comprising a challenge bit sequence (C);
   transmitting from the prover to the verifier a response message comprising a response bit sequence (R);
   verifying, in the verifier, the response message on the basis of the response bit sequence (R); and
   determining, in the verifier, the distance between the verifier and the prover on the basis of the time difference between the challenge message and the response message;
   wherein the challenge message and/or the response message are transmitted by a transmission protocol in which the bit sequence of the corresponding message is transmitted by a transformed spreading code chip sequence (TCSC, TRSCS), wherein the transformed spreading code chip sequence (TCSCS, TRSCS) is obtained by transforming the spreading code chip sequence (CSCS, RSCS) of the bit sequence (C, R) on the basis of a transform function;
   wherein the verifier or the prover receiving the transformed spreading code chip sequence (TCSCS, TRSCS):
      retrieves the spreading code chip sequence (CSCS, RSCS) on the basis of the transformed spreading code chip sequence (TCSCS, TRSCS) and the transform function;
      retrieves the bit sequence (C, R) from the retrieved spreading code chip sequence (CSCS, RSCS) on the basis of corresponding spreading codes.

2. The method according to claim I, wherein the spreading code chip sequence is obtained by replacing each bit of the bit sequence by its corresponding spreading code.

3. The method according to claim 1, wherein each spreading code comprises at least two chips.

4. The method according to claim 1, wherein the transform function is known in the prover and the verifier.

5. The method according to claim 4, wherein the transform function is exchanged between the prover and the verifier by an encrypted message before transmitting the challenge message and/or the response message.

6. The method according to claim 1, wherein the transform function is such that a subsequent chip within one spread code of the spreading code chip sequence of the bit sequence cannot be predicted by at least one preceding chip of the same one spread code without the knowledge of the transform function.

7. The method according to claim 1, wherein the transform function is such that each chip of the transformed spreading code chip sequence depends on only one chip of the spreading code chip sequence.

8. The method according to claim 1, wherein the transform function is such that it does not degrade the property of the spreading code.

9. The method according to claim 1, wherein each chip of the transformed spreading code chip sequence is transmitted by a wideband pulse with a bandwidth larger than 50 MHz.

10. The method according to claim 1, wherein the analogue signal of the challenge message and/or response message has a bandwidth larger than the chipping frequency, preferably ten times larger.

11. The method according to claim 1, wherein the verifier or the prover transmitting the message
   creates the spreading code chip sequence on the basis of the bit sequence and the spreading codes;
   transforms the spreading code chip sequence on the basis of the transform function into the transformed spreading code chip sequence; and
   transmits the transformed spreading code chip sequence.

12. The method according to claim 11, wherein the verifier or the prover receiving the message further
   stores the sample points of the received message including all chips of the transformed spreading code chip sequence, and
   detects the transformed spreading code chip sequence from the stored sample points of the received message.

13. The method according to claim 12, wherein the verifier or the prover receiving the message further
   predicts time windows, when each chip of the transformed spreading code chip sequence will be received, and
   stores the sample points of the received message for the predicted time windows, and
   detects the transformed spreading code chip sequence from the stored time windows of the received message.

14. The method according to claim 13, wherein the message comprises a predetermined header section transmitted before the transformed spreading code chip sequence used for predicting the time windows, when each chip of the transformed spreading code chip sequence will be received.

15. The method according to claim 13, wherein the time windows are predicted on the basis of a time offset between the verifier and the prover.

16. A device of a system for secure distance measurement comprising:
   a transmitter configured for transmitting a transmitted message comprising a bit sequence (C, R);
   a receiver configured for receiving a received message comprising a, bit sequence (C, R);
   wherein the transmitter is configured to transmit the transmitted message by a transmission protocol in which the bit sequence (C, R) of the corresponding message is transmitted by a transformed spreading code chip sequence (TCSCS, TRSCS), wherein the transformed spreading code chip sequence (TCSCS, TRSCS) is obtained by transforming a spreading code chip sequence (CSCS, RSCS) of the bit sequence on the basis of a transform function;
   wherein the receiver is configured to receive a transformed spreading code chip sequence (TCSCS, TRSCS) and is further configured to:
      retrieve the spreading code chip sequence (CSCS, RSCS) on the basis of the transformed spreading code chip sequence (TCSCS, TRSCS) and the transform function:
      retrieve the bit sequence (C, R) from the retrieved spreading code chip sequence (CSCS, RSCS) on the basis of corresponding spreading codes.

17. The device according to claim 16, wherein the device is a verifier configured to:
   verifying the received message on the basis of the bit sequence of the received message, and
   determining the distance to a prover on the basis of the time difference between the transmitted message and the received message.

18. The device according to claim 17, wherein the device is a prover configured to creating a bit sequence of the transmitted message.

* * * * *